United States Patent
Freeman

(10) Patent No.: US 7,388,631 B2
(45) Date of Patent: Jun. 17, 2008

(54) PARALLAX COMPENSATING COLOR FILTER AND BLACK MASK FOR DISPLAY APPARATUS

(75) Inventor: Gary A. Freeman, Newton Center, MA (US)

(73) Assignee: Samsung Electronics, Co., Ltd., Kyungki-do (KR)

( * ) Notice: Subject to any disclaimer, the term of this patent is extended or adjusted under 35 U.S.C. 154(b) by 0 days.

(21) Appl. No.: 10/268,463

(22) Filed: Oct. 10, 2002

(65) Prior Publication Data

US 2004/0070706 A1    Apr. 15, 2004

(51) Int. Cl.
G02F 1/1333 (2006.01)
G02F 1/1335 (2006.01)

(52) U.S. Cl. .................. 349/110; 349/106
(58) Field of Classification Search ............. 349/106, 349/110, 113, 114, 115
See application file for complete search history.

(56) References Cited

U.S. PATENT DOCUMENTS

| | | | |
|---|---|---|---|
| 4,560,241 A | 12/1985 | Stolov et al. | |
| 4,610,509 A | 9/1986 | Sorimachi et al. | |
| 4,673,253 A | 6/1987 | Tanabe et al. | |
| 4,690,511 A | 9/1987 | Watanabe | |
| 4,877,697 A | 10/1989 | Vollmann et al. | |
| 4,953,952 A | 9/1990 | Okumura et al. | |
| 5,399,374 A | 3/1995 | Sumi et al. | |
| 5,666,174 A * | 9/1997 | Cupolo, III | 349/64 |
| 5,673,093 A | 9/1997 | Brody | |
| 5,754,261 A | 5/1998 | Lyu | |
| 5,907,383 A * | 5/1999 | Kurihara et al. | 349/191 |
| 5,990,993 A * | 11/1999 | Haas | 349/96 |
| 6,140,988 A | 10/2000 | Yamada | |
| 6,172,723 B1 * | 1/2001 | Inoue et al. | 349/95 |
| 6,469,758 B2 * | 10/2002 | Yu | 349/106 |
| 6,690,438 B2 * | 2/2004 | Sekiguchi | 349/114 |
| 6,762,808 B2 * | 7/2004 | Bayrle et al. | 349/106 |
| 2003/0001994 A1 * | 1/2003 | Iino | 349/113 |

* cited by examiner

Primary Examiner—Michael H Caley
(74) Attorney, Agent, or Firm—MacPherson Kwok Chen & Heid LLP; Mark A. Pellegrini

(57) ABSTRACT

A color display device comprising at least two substrates spaced from each other, the substrates each having an internal and an external surface, the internal surfaces of the two substrates facing each other, at least one of the substrates being transparent; electrodes positioned to establish a field in the space between the two substrates; an optically active material occupying at least a portion of the space between the two substrates and having optical properties influenced by the field; a color filter layer comprising color filter elements that alter the color of light traveling through the color filter layer, the color filter elements being positioned outside of the space between the two substrates; and a three-dimensional black mask comprising mask elements aligned with the boundaries between adjoining color filter elements. The three-dimensional black mask structure allows the color filter to be placed on the exterior of the display while still maintaining good color performance under off-axis viewing conditions.

33 Claims, 10 Drawing Sheets

| SPACE BETWEEN COLOR FILTERS | SUBSTRATE THICKNESS = 3 MIL | SUBSTRATE THICKNESS = 2 MIL | SUBSTRATE THICKNESS = 1 MIL |
|---|---|---|---|
| | PERCENT COLOR SATURATION/ BRIGHTNESS/BLACKNESS | PERCENT COLOR SATURATION/ BRIGHTNESS/BLACKNESS | PERCENT COLOR SATURATION/ BRIGHTNESS/BLACKNESS |
| 5 μm | 73/95/90 | 83/95/90 | 92/95/90 |
| 10 μm | 76/90/90 | 85/90/90 | 94/90/90 |
| 15 μm | 78/85/90 | 87/85/90 | 96/85/92 |
| 20 μm | 81/80/90 | 90/80/90 | 98/80/94 |

FIG. 3

| BLACK MASK WIDTH | PLASTIC THICKNESS = 3 MIL | PLASTIC THICKNESS = 2 MIL | PLASTIC THICKNESS = 1 MIL |
|---|---|---|---|
| | PERCENT COLOR SATURATION/ BRIGHTNESS | PERCENT COLOR SATURATION/ BRIGHTNESS | PERCENT COLOR SATURATION/ BRIGHTNESS |
| 5 μm | 80/93 | 89/93 | 98/93 |
| 10 μm | 82.5/88 | 92/88 | 100/88 |
| 15 μm | 85/83 | 94/83 | 100/86 |
| 20 μm | 87/78 | 96/78 | 100/84 |

FIG. 11

PARALLAX COMPENSATING COLOR FILTER AND BLACK MASK FOR DISPLAY APPARATUS

TECHNICAL FIELD

This invention relates to the color filters and black masks used in electro-optic and magneto-optic color displays.

BACKGROUND

Color display panels are typically constructed by locating differently colored sub-pixels at each pixel of the display panel. Color is provided by a color filter layer having color filter elements aligned with light valves that regulate the amount of light passing through each sub-pixel. The overall color and brightness of the light associated with a given display pixel location is perceived by the human eye as a mixture of the differently-colored sub-pixels at that location. To prevent cross contamination of light between sub-pixels (i.e., light following paths through the light valve of one sub-pixel and the color filter element of a neighboring sub-pixel) and resulting loss of blackness and color saturation, a so-called black mask layer provides masking at the boundaries between the color filter elements.

The light valves at each sub-pixel are typically provided by an electro-optic or magneto-optic ("EO/MO") display. These include liquid crystal, electrophoretic, cholesteric, and Gyricon displays (as discussed in my U.S. application Ser. No. 09/882,311, filed on Jun. 15, 2001). Usually the light valves all generate the same color light, and it is the color filter elements that produce the color of the display.

Ideally, a color filter element and surrounding black mask would be at the same location along the normal direction of the display (i.e., the direction normal to the plane of the display). In other words, there would ideally be zero space along the normal direction between the light valves and the associated color filter elements and black masks. This would minimize or eliminate the possibility of cross contamination of light between sub-pixels.

In an electro-optic and magneto-optic display, the light valve is typically located in a very thin gap between two substrates. For example, in a liquid crystal display, the liquid crystal material is what acts as the light valve, and it is sandwiched in a very thin layer between two substrates. To minimize color inaccuracy, the prior art has conventionally placed the color filter and black mask layers in that same thin gap between the substrates (e.g., in FIG. 1 the color filter and black mask layers have been deposited on the internal surface of one of the substrates). Materials have been selected that can withstand the harsh manufacturing processes followed in manufacturing an EO/MO display without detrimental impacts on the performance of the color and black mask layers. Typical black mask materials are black organic color agents or thin metal films. Metal films are generally favored over organic materials because of their superior light-intercepting performance.

As noted in U.S. Pat. No. 5,399,374, one of the methods for forming the color filter with a black mask composed of a thin metal film is to use an etching process. First, a conductive film such as indium tin oxide (ITO) which can be etched is formed on a transparent substrate such as a glass, and then the conductive film is etched to be formed into the configuration of the black mask having a predetermined pattern. After that the black mask is formed on the conductive film by performing electroless plating using a metal such as nickel. Color patterns are then laminated on the black mask. Another method for forming the color filter is to first sputter a metal such as chromium on a transparent substrate to form a thin film of the metal, and then to etch that film into the configuration of the desired black mask pattern. Patterned color filter layers are then laminated over the black mask layer. According to still another method, a resist is applied to areas of a transparent substrate that are not to receive the black mask, a metal is sputtered into a thin film over the resist, and the resist is removed, leaving the black mask in areas not originally covered by the resist.

In some prior art, the color filter and black mask layers have been located outside of the display cell, but this results in parallax problems, as illustrated in FIG. 2. In the figure, the color filter and black mask layers have been applied to the outer surface of one of the display cell substrates. Three differently-colored sub-pixels are shown in the figure, each with its own color filter element, and with black masks located between the filter elements (in a layer just above the color filter layer). The light valve for each sub-pixel is provided by the liquid crystal layer between the substrates, and is spaced above the color filter and black mask layers by at least the thickness of the substrate. Light traveling through the display along paths 100 fairly close to the normal direction is not particularly affected by moving the color filter and black mask layers outside the substrates, but light traveling along paths 102, 104, at incident angles α substantially away from the normal direction (0° incident angle being the normal direction) can produce inaccuracies, because such angled light can pass through the color filter of one sub-pixel but through the light valve of an adjoining, and differently-colored, sub-pixel.

The parallax problems caused by the separation of the color filter and black mask from the light valve are of at least two different types. First, is a loss of blackness. This is illustrated by light traveling along path 102 in FIG. 2. In this example, the leftmost sub-pixel is supposed to be turned off, i.e., the color component corresponding to that sub-pixel is supposed to be zero. If it were not for the parallax difficulty, the display would appear dark over the leftmost sub-pixel. The problem is that light traveling along path 102, which would have been blocked by a black mask had the black mask layer been located at its conventional location (in white areas 42), is able instead to pass through the display. This has the undesirable effect of reducing the blackness of a display, i.e., the extent to which a desired sub-pixel or group of sub-pixels or entire pixels can be shut off entirely.

Another problem that parallax causes is loss of color saturation and color shift. This is illustrated by light traveling along path 104 in FIG. 2. The color and intensity (saturation) of color associated with the leftmost sub-pixel should be prescribed entirely by the leftmost color filter and the leftmost light valve, respectively. But light traveling along path 104, though it has its color prescribed correctly by the leftmost color filter, it has the intensity of that color prescribed by the light valve associated with the neighboring sub-pixel.

The table of FIG. 3 compiles the color saturation, brightness, and blackness (in percent) for light incident at 30° for different substrate thicknesses (1 mil, 2 mil, and 3 mil) and different spacings between the color filters. The graphs of FIGS. 4-6 compile the same three parameters (color saturation, brightness, and blackness, in percent) for a 10 μm color filter spacing for different light incident angles at the same three substrate thicknesses. The color filter spacing is the width of the black mask dividing adjoining color filter elements. As can be seen in the table and graphs, when the spaces between the color filters decreases, the brightness of the display increases and the color saturation decreases slightly. When the spaces between the color filters increases, the color saturation increases but the brightness decreases quite dramatically. As the thickness of the plastic decreases, the color saturation improves but the brightness stays constant. Blackness remains essentially unchanged at all of the parameter settings.

As noted earlier, the conventional solution to this parallax problem is to fabricate the color filter and black mask layers on the inner surface of one of the substrates, thus placing it within a few microns of the optically active element (e.g., the liquid crystal light valve). The difficulty with this method is that the color filter, when it is placed inside the display, must undergo all of the harsh processing necessary to manufacturing the display cell. The color filter is generally placed underneath both the ITO layer and the polyimide alignment layer (as the ITO layer needs to be as close to the liquid crystal as possible to reduce drive voltages, and the alignment layer needs to be in direct contact with the liquid crystal to provide the alignment). As a result, the color filter must withstand all the processing required to produce the ITO and alignment layer. These include harsh acids, bases, high temperatures (greater than 180° C.), and solvents. This requirement severely limits the chemicals available to provide the color, adding cost and reducing design flexibility and product performance.

As noted, there are instances in the prior art in which the color filter and black mask layers have been moved outside of the display cell. But none of these has addressed, let alone solved, the parallax problem. For example, U.S. Pat. Nos. 4,877,697, 4,610,508, and 4,673,253 suggest that displays be constructed by exposing color film while the film is in registry with the display element, to reduce registration errors between the color filter elements and the electrodes that define the locations of the light valves of the display. U.S. Pat. No. 5,754,261 shows the color filter layer located on the outside surface of the substrates. U.S. Pat. Nos. 4,690,511 and 4,560,241 show using a very thin auxiliary layer of glass dividing the color filter and the liquid crystal layer. U.S. Pat. No. 4,953,952 shows the color filter placed inside a plastic film laminate structure of the polarizer filter.

SUMMARY

In a first aspect, the invention features a color display device comprising: at least two substrates spaced from each other, the substrates each having an internal and an external surface, the internal surfaces of the two substrates facing each other, at least one of the substrates being transparent; electrodes positioned to establish a field in the space between the two substrates; an optically active material occupying at least a portion of the space between the two substrates and having optical properties influenced by the field; a color filter layer comprising color filter elements that alter the color of light traveling through the color filter layer, the color filter elements being positioned outside of the space between the two substrates; and a three-dimensional black mask comprising mask elements aligned with the boundaries between adjoining color filter elements.

The three-dimensional black mask structure allows the color filter to be placed on the exterior of the display while still maintaining good color performance under off-axis viewing conditions.

Preferred implementations of this aspect of the invention may incorporate one or more of the following: The three-dimensional black mask may comprise at least two black mask layers. The black mask layers may comprise at least one internal layer located between the two substrates and at least one external layer located either on an exterior surface of one of the two substrates or on another substrate external to the two substrates. The three-dimensional black mask may further comprise a third black mask layer. The black mask layers may comprise at least one internal layer located between the two substrates and two external layers, each located either on an exterior surface of one of the two substrates or on another substrate external to the two substrates. The three-dimensional black mask may have an aspect ratio of at least about 0.2 (preferably at least about 0.35, and most preferably at least about 0.5). The display device may further comprise a third substrate supporting at least one black mask layer. The optically active material may be an EO/MO material. The EO/MO material may be a liquid crystal material. The color filter layer may be formed by a printing process. The color filter layer may comprise multiple sub-layers, at least one for each different color. The color filter layer may be formed on external surface of one of the two substrates. The color filter layers may be formed on a third substrate laminated to the first and second substrates. The spacing in the normal direction between the optically active material and the color filter layer may be greater than 1 mil. The two substrates may each may have a thickness in the range of about 20 μm to 500 μm (preferably about 30 μm to 250 μm, and most preferably about 50 μm to 150 μm).

In a second aspect, the invention features a method for manufacturing a color display device, the method comprising fabricating a display cell from at least two substrates, wherein the substrates each have an internal and an external surface, the internal surfaces of the two substrates face each other, at least one of the substrates being transparent, and wherein electrodes are positioned to establish a field in the space between the two substrates, and wherein an optically active material occupies at least a portion of the space between the two substrates and has optical properties influenced by the field; testing the performance of the display cell; and adding a color filter layer to the display cell only if the display cell passes the performance test, wherein the color filter layer is located exterior of the display cell.

Preferred implementations of this aspect of the invention may further comprise adding at least one black mask layer following testing of the performance of the display cell.

In a third aspect, the invention features a display device comprising: at least two substrates spaced from each other, the substrates each having an internal and an external surface, the internal surfaces of the two substrates facing each other, at least one of the substrates being transparent; electrodes positioned to establish a field in the space between the two substrates; an optically active material occupying at least a portion of the space between the two substrates and having optical properties influenced by the field; a fill port through which the optically active material was inserted into the space between the two substrates; a flexible film cover overlying and sealed to the fill port, wherein the film cover and fill port are sized and positioned so that a predetermined quantity of optically active material may be sealed in place inside the film cover after the space between the substrates is evacuated, and so that the film cover will deflect inwardly at the fill port to force the optically active material into the space between the substrates when the device is exposed to ambient pressure.

Preferred implementations of this aspect of the invention may incorporate one or more of the following: The optically active material may be a liquid crystal material. The display may further comprise a second flexible film cover overlying and sealed to the film port, and the first mentioned and second film covers and the film port may be sized and positioned so that the predetermined quantity of optically active material is positioned between the two film covers, and an opening may be provided on the interior of the two film covers so that the optically active material may flow through the opening into the space between the two substrates when the film covers are deflected inwardly by the device being exposed to ambient pressure.

Among the many advantages of the invention (some of which may be achieved only in some of its various aspects and implementations) are that manufacturing costs are reduced because standard printing processes can be used to produce the color filter layer. The quality of color can be improved because a broader range of dyes and inks are available (because they do not any longer need to withstand extreme processing conditions). Displays can be tested for electro-optical performance prior to attaching the color filters, thus reducing the cost of rejected parts (currently, color filters are destroyed when a display is rejected, as the color filter is already built into the display).

The invention provides greater design flexibility. For example, with the color filter on the outside of the display, and able to be produced for instance by an off-the-shelf color proofing printing system, turnaround time for generating new filters is significantly reduced. This is particularly helpful when developing displays, as color is subjective and it is often difficult to achieve the exact display color acceptable to the customer the first time. Multiple, quick turnarounds provide higher customer satisfaction and shorter design cycles.

BRIEF DESCRIPTION OF THE DRAWINGS

FIG. 3 is a table containing calculated color saturation, brightness, and blackness percentage for a display of the construction of FIG. 2 for light striking the display at a 30° incident angle for a range of substrate thicknesses and color filter spacings.

FIG. 5, 2 mil; FIG. 6, 1 mil).

FIG. 11 is a table containing calculated color saturation and brightness percentage for a display of the construction of FIGS. 7 and 10 for light striking the display at a 30° incident angle for a range of substrate thicknesses and color filter spacings.

FIG. 13, 2 mil; FIG. 14, 1 mil).

DETAILED DESCRIPTIONS

There are a great many different implementations of the invention possible, too many to possibly describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 7:
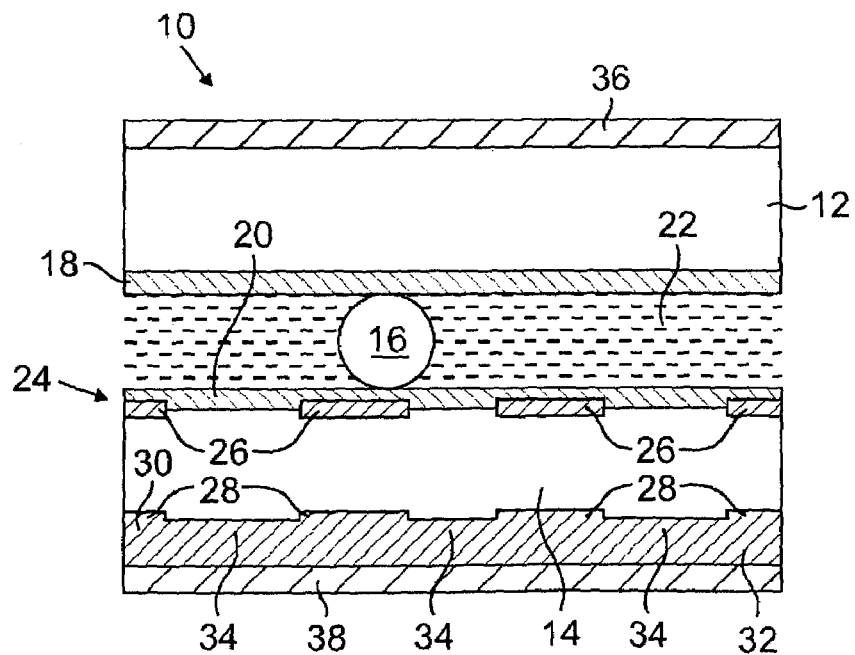
FIG. 7 is a diagrammatic cross-sectional view of approximately one pixel of a display constructed according to one possible implementation of the invention.

The descriptions below are more than sufficient for one skilled in the art to construct the disclosed implementations. Unless otherwise mentioned, the processes and manufacturing methods referred to are ones known by those working in the art A first implementation is shown in FIG. 7, which is a diagrammatic cross section (greatly enlarged) of a portion of a liquid crystal display 10, which has upper and lower substrates 12, 14 separated by spacer elements 16. Indium tin oxide (ITO) and polyimide alignment layers 18, 20 are deposited on the inner faces of the substrates. An electro-optic liquid crystal material 22 fills the space between the substrates. An inner black mask layer 24 is applied to the inner surface of substrate 14. The mask elements 26 of the inner black mask layer are aligned with the mask elements 28 of an outer black mask layer 30, which is applied to the outer surface of substrate 14. A color filter layer 32, with individual color filter elements 34 is applied over the outer black mask layer. Additional films 36, 38, such as a polarizer, reflector, and other compensation films, can be applied to the top and bottom of the display.

Figure 8:
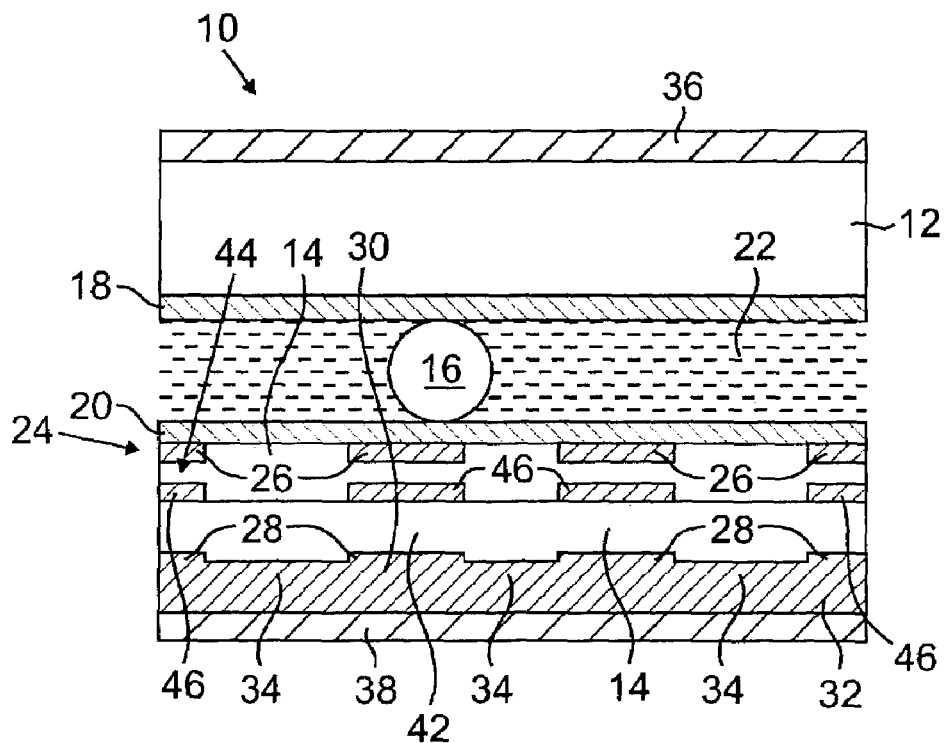
FIG. 8 is a diagrammatic cross-sectional view of approximately one pixel of a display constructed according to a second implementation of the invention.

A second implementation is shown in FIG. 8. It differs from that of FIG. 7 in that the color filter layer 32 and outer black mask layer 30 are formed on a separate substrate 42. A third black mask layer 44 is applied to the outer surface of the lower substrate 14 (or alternatively to the side of substrate 42 opposite the color filter). Mask elements 46 of the third mask layer are aligned with mask elements 26, 28 of the other two mask layers. In the figures, the black mask elements are diagrammatically shown indented into the substrate on which they are applied, whereas, in actuality, they are applied on top of the planar surface of that substrate.

Figure 9:
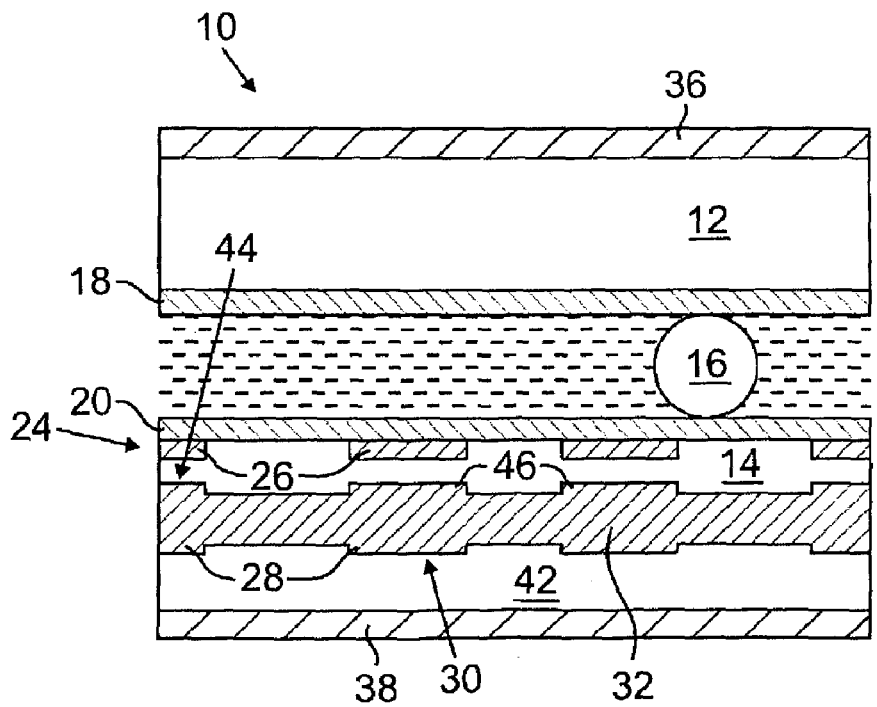
FIG. 9 is a diagrammatic cross-sectional view of approximately one pixel of a display constructed according to a third implementation of the invention.

A third implementation is shown in FIG. 9. It differs from that of FIG. 7 in that the orientation of substrate 42 is reversed, so that the color filter layer 32 is sandwiched between black mask layers 30 and 44.

All three of the implementations have a three-dimensional black mask layer because the aspect ratio of the black mask layer is at least 0.2, and preferably at least 0.35, and most preferably at least 0.50. The aspect ratio of a black mask layer is the ratio of height of the black mask (the height being the spacing between the two outermost black mask layers, layers 24 and 30 in FIGS. 7-9) to the width of the color sub-pixels (the center to center distance between adjoining sub-pixels).

The display cell can be constructed in many different ways. A preferred technique is the one taught in my U.S. application Ser. No. 09/882,311, filed on Jun. 15, 2001 (the content of which is hereby incorporated by reference), but other display cell constructions can be used in practicing the invention. As described in the application, substrate layers bearing indium tin oxide (ITO) electrodes and an alignment layer are bonded with gasket and spacers and filled with liquid crystal. The cell is tested for proper electro-optic (or magneto-optic) performance, and then a color filter is applied. The cell with color filter is then tested for performance. Electronics (e.g., a flex circuit with one or more integrated display driver ICs and associated passive components) are then attached.

The flexible substrates 12, 14, 42 used in the display cell are preferably an optically clear, very thin film (e.g., about 20 μm to about 500 μm, preferably about 30 μm to about 250 μm and, more preferably, about 50 μm to about 150 μm) that has high tensile strength and modulus, a low dielectric constant, a high degree of thermal stability, a low electrical dissipation factor and good dielectric strength. Any of a variety of flexible substrate materials will work, including those used in the production of flexible electronic circuits, including but not limited to polyester (e.g., Mylar® from Dupont), polyethersulphone, polynorbornene, polyethylene naphthalate, polycarbonate, and other flexible plastic materials that are well known to those in the art.

The preparation of the substrate begins with forming the inner black mask layer 24, with its individual mask elements 26. The inner black mask layer 24 may differ in composition from the outer black mask layers 30, 44, as the inner mask layer resides on the inside of the cell and must undergo, and thus be impervious to, all the processing steps used in manufacturing the cell, e.g. baking, etching and other chemical processing. The outer black mask layers can be composed of a broader selection of materials, including those that would be adversely affected by the display processing steps, but can be utilized since they are applied after the display cell has been manufactured.

The inner black mask layer can be formed from photo-imageable polymer resins, typically polyimide-based resins with a high temperature resistance. The resins are pigmented to achieve a high degree of opacity for appropriate masking capability. Toppan (Japan) is one manufacturer of such resins. Standard photo-imaging methods known to those skilled in the art can be used to apply the resin black mask to the substrates that will be adjacent to the color filter.

Alternatively, the inner black mask layer can be composed of a thin metal film. Various processes are known in the art for creating such a mask layer. For example, it can be made by depositing a conductive film such as indium tin oxide (ITO) on the substrate, and then etching the film to form the desired mask pattern. The black mask is then formed on the conductive film by electroless plating, using a metal such as nickel.

Another method for forming the black mask is to sputter a metal such as chromium onto the substrate to form a thin film, and then etch the thin film into the desired mask pattern.

Another method is to form a resist on portions of the substrate that do not require the black mask, then deposit a thin metal film by sputtering, and then remove the resist to leave only the desired mask pattern.

After formation of the inner black mask layer, a planarization layer, typically composed of a polyimide resin or other hardcoat, is applied. A clear conductive element such as ITO is then applied to the surface via vacuum deposition methods known to those skilled in the art. The planarization layer provides an electrically insulating layer to isolate the metal film of the mask from the ITO conductive elements (in the case of an organic black mask layer, the planarization layer provides a surface flat enough for the ITO to be deposited thereon. The conductive element is preferably an optically clear material known for use in EO/MO displays, such as indium tin oxide (ITO), or another substantially clear conductive material, such as a conductive polymer comprising metal particles such as silver or nickel, graphite or other conductive carbon material, and the like. The conductive element can be deposited onto the flexible substrate by known methods. For example, ITO is conventionally deposited onto flexible substrates by sputtering. Methods and materials for photo-patterning the flexible circuit and conductive element layers are commonly known.

An EO/MO cell is then assembled. Liquid crystal displays require deposition of an alignment layer composed typically of a polyimide that has been appropriately rubbed using materials and methods well known by those skilled in the art. In most embodiments, the polyimide is deposited by dipping, spin-coating, or printing, then heat cured and physically rubbed with an appropriate cloth material.

A gasket 50 is deposited on the surface of one of the substrates. A fill port 52 is left open in the perimeter of the gasket to allow for filling the cell with EO/MO material when the cell is assembled. Gasket materials are well known and include, but are not limited to, thermosetting epoxy-based adhesives. Optional spacer elements 16 are deposited onto the surface of at least one of the substrates 12, 14 inside the area defined by the perimeter of the gasket 50. For example, liquid crystal displays require spacers to maintain the thickness of the liquid crystal layer. That thickness is the major determinant of the EO properties of the display. The spacers are often plastic insulating microspheres, such as those manufactured by Sekisui (Japan). The spacer elements can also take other forms such as, but not limited to, ribs or posts embossed or printed directly onto the flexible substrate or on a porous film layer interposed between the upper and lower portions of the flexible substrate in the assembled cell. Polymer for providing a structural bond between substrates 12, 14 can be provided by introducing a prepolymer into the space between the substrates, and curing the prepolymer in situ. A liquid prepolymer can be introduced by coating the spacers with the liquid prepolymer at the time they are applied to one of the substrates (e.g., by wet spraying the spacers). [Add cite to Liquid Prepolymer application]

Figure 15:
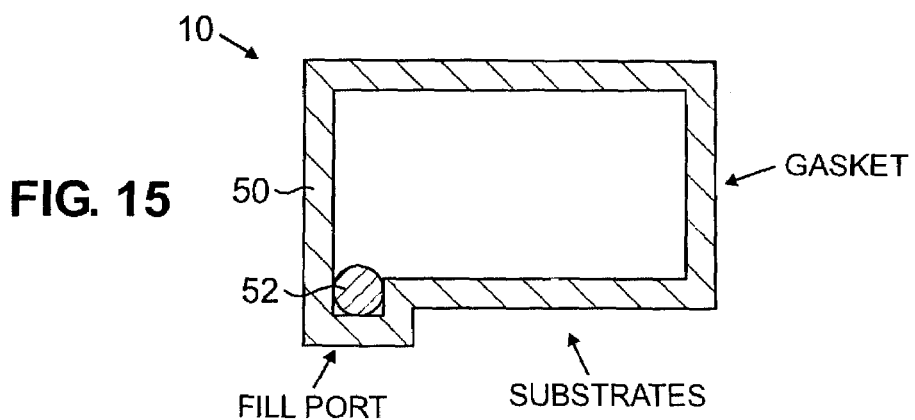
FIG. 15 is a diagrammatic plan view of a display cell having a fill port constructed according to one implementation of the invention.

After assembly of the gasket and spacers on the substrate, the surfaces of the cell are laminated by known methods at a pressure of about 5 psi or more to produce curing of the gasket. Alternatively, the gasket can be made of a material that can be cured by ultraviolet (UV) light. The laminated cell is then placed in a vacuum chamber and evacuated for a period of time, which can be from about 2 to about 8 hours, to substantially remove all air from the cell. EO/MO material is then placed at the opening of the fill port 52 (FIG. 15) to completely cover the opening of the port. The pressure of the chamber is then increased gradually, forcing the EO/MO material into the fill port opening. When the cell is completely filled with the EO/MO material, the chamber is brought to room pressure and the fill port opening is sealed with an adhesive, such as a UV-curing adhesive, or the like.

An alternative method for filling the cell is as follows. The gasket 50 is dispensed as a continuous perimeter with no fill port 52. Prior to laminating the two substrates, the EO/MO material, such as liquid crystal, is dispensed into the area surrounded by the gasket 50 and along the gasket line adjacent to one edge. When the display is laminated, it is rolled together under pressure, beginning at that edge. Any excess active material is squeezed out of the assembly over the lip of the gasket 50. Alternatively, an exact amount of active material may be dispensed into the area surrounded by the gasket 50 while the whole assembly is maintained under vacuum conditions. The assembly is laminated while still under vacuum. The atmospheric pressure is increased and the gasket 50 is then cured.

Figure 16:
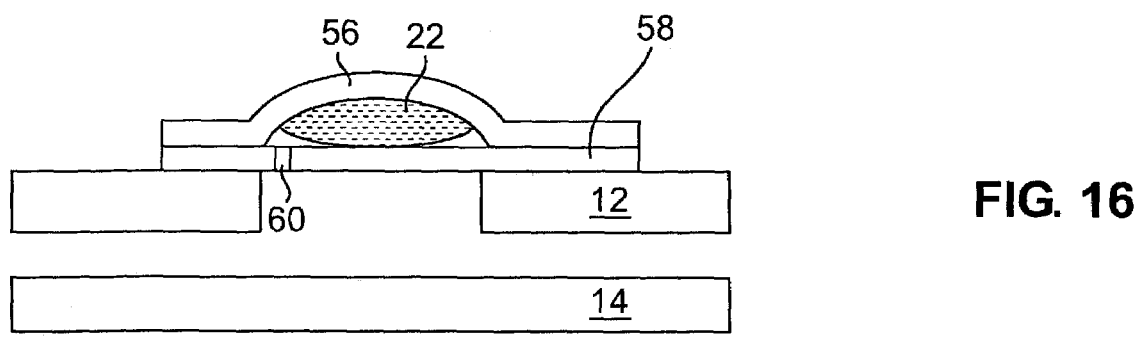
FIGS. 16 and 17 are diagrammatic cross-sectional views of a display cell filled with liquid crystal using another implementation of the invention.
Figure 17:
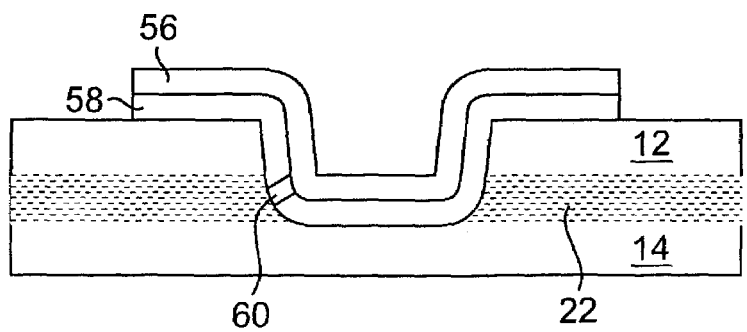

In another alternative embodiment, shown in FIGS. 16-17, the gasket 50 is dispensed as a continuous perimeter, and a fill port 52 is located within the interior of the gasket perimeter. A hole is made in at least one of the substrates, and preferably in just one, inside the gasket perimeter, with the hole located outside the viewing area of the display. As before, the surfaces of the cell can be laminated by known methods at a pressure of about 5 psi or more to produce curing of the gasket. Alternatively, the gasket can be made of a material that can be cured by ultraviolet (UV) light, as known to those skilled in the art. The laminated cell is then placed in a vacuum chamber and evacuated for a period of time, which can be from about 2 to about 8 hours, to substantially remove all air from the cell. While the display is still under vacuum the amount of EO/MO material 22 needed to fill the void between the substrates is deposited in the well created by the hole. The hole is then sealed with an adhesive-backed flexible film cover 56. Upon removal from the vacuum and return to atmospheric pressure, the liquid is forced into the void between the substrates with the film seal conforming to allow for full injection of the liquid into the void. If the volume of the void to be filled is too large for the liquid to be completely contained in the well created by the hole in the one substrate, the film seal can be fabricated from two layers 56, 58 (as shown in FIGS. 16, 17) with the liquid 22 contained in a pocket between the layers. A hole 60 is provided in the bottom layer 58 for injecting the liquid after the seal has been applied and the display is returned to atmospheric pressure. The hole is made small enough so that it does not leak during normal handling.

When the cell has been assembled it will be tested to determine the proper electro-optical or magneto-optical performance levels, e.g., contrast, drive voltages, response time, by methods known to those skilled in the art. If tests are successful, the color filter will be applied. In the preferred embodiment, a color proofing digital printing system (e.g., Fuji Graphic Systems FinalProof Luxel 5600) is used to print the black mask and color filter elements. FIG. 7 shows an embodiment where the filter is printed directly on the finished display cell. In this case, the display cell is mounted directly on the printing drum of the Luxel 5600. This is possible because of the display's flexibility. The Luxel 5600 works by heat transfer of pigmented polymer thin films onto the receiving substrate (in this case the display cell). Heating of the pigment is accomplished by a focused diode laser traveling in a linear path, scanning row by row while the printing drum rotates between laser scans. Each color layer (cyan, magenta, yellow, black) is printed in separate pass with different film layers. Utilizing registration marks in the display itself, etched into the ITO layer, the color filter size, rotation, offset, and other more subtle optical compensations such as pin-cushion, etc. the digital image can be adjusted prior to printing onto the display to achieve near perfect registration of the color filter element to the photo-patterned conductors.

For high resolution displays such as those used in laptops, near perfect registration is critical, because to achieve high contrast with good color rendition the color filter must be aligned to the active pixel element (photo-patterned conductors in the case of passive displays or the TFT transistor electrode area in the case of active displays.). Typically an alignment of less than 5 microns is required for high resolution color displays. The disclosed implementations of the invention are able to achieve that alignment accuracy via optical registration and image compensation. Since the filter is attached directly to the display substrate, other issues such as matching of the thermal coefficients of expansion between a separate filter element and the display substrate are eliminated.

In alternative embodiments, e.g., as shown in FIGS. 8-9, the color film may be printed on a separate substrate that can be applied directly to the front of the display cell.

To drive the display, the method typically used is to mechanically and electronically connect a flexible electronic circuit to the inner surface of the lower substrate along a contact ledge by an anisotropically conductive adhesive (ACF). The flexible circuit is used both to provide electrical connections to the system electronics as well as provide electronics on its substrate that are specifically related to the display operation. The flexible circuit is applied after application of the color filter Additional tests are run on the flex display assembly, and, if successful, the polarizer and other films, such as compensation or antireflection films, are applied.

Figure 2:
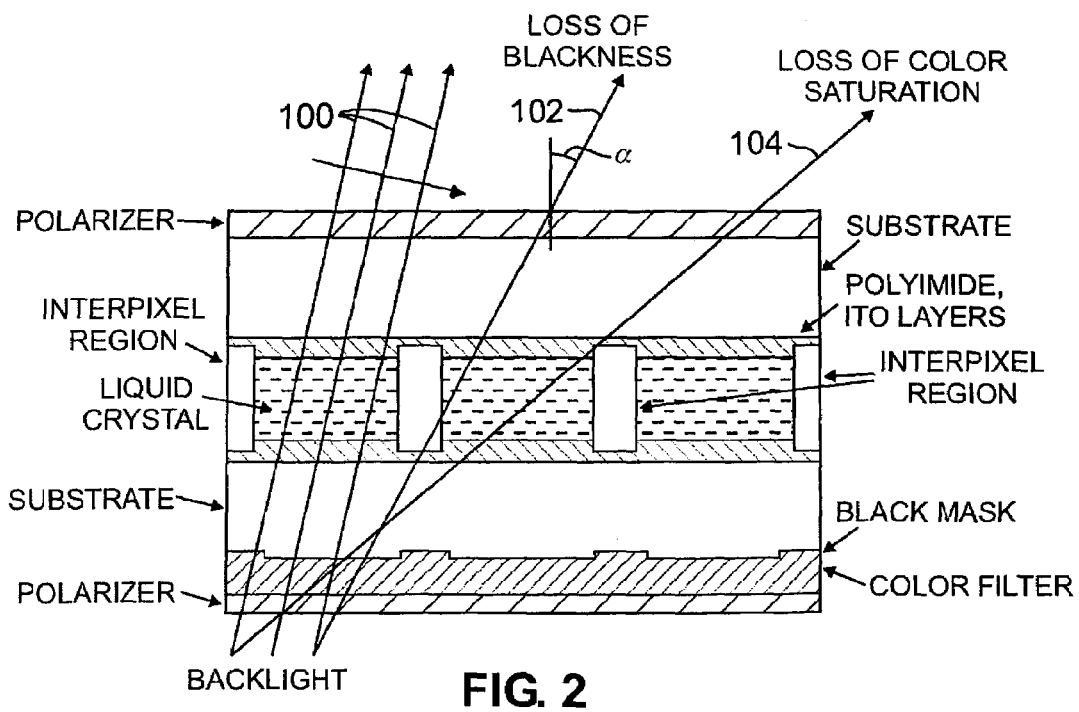
FIG. 2 is a diagrammatic cross-sectional view of approximately one pixel of a display in which the color filter and black mask layers are located on the outside surface of one of the display substrates.
Figure 4:
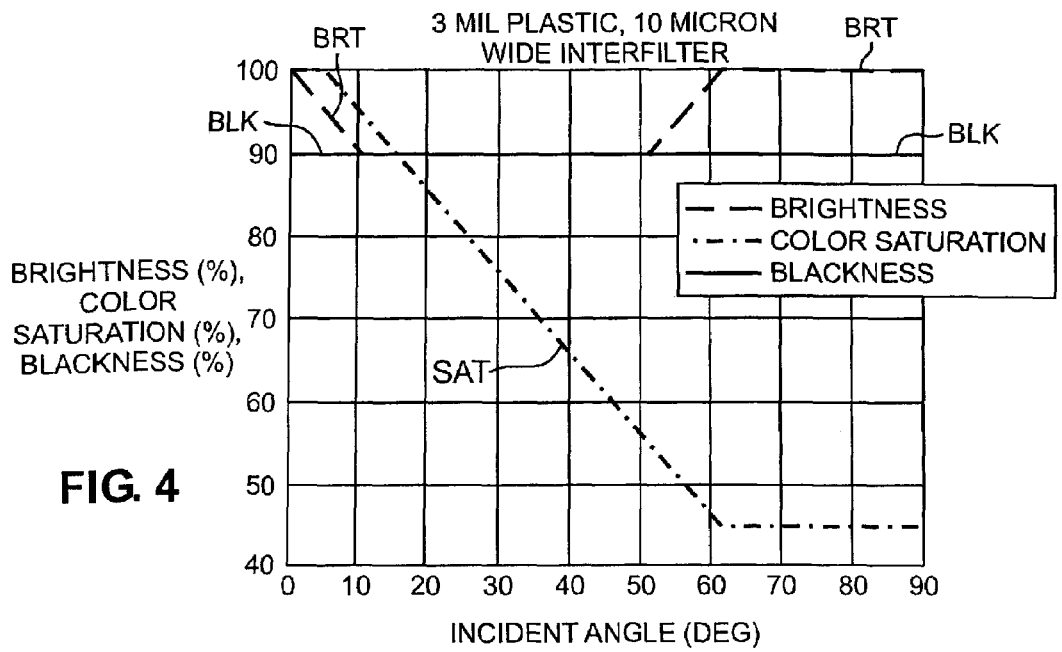
FIGS. 4-6 are graphs of calculated color saturation, brightness, and blackness for a display of the construction shown in FIG. 2 at a color filter spacing of 10 µm for a range of light incident angles and substrate thicknesses (FIG. 4, 3 mil.
Figure 5:
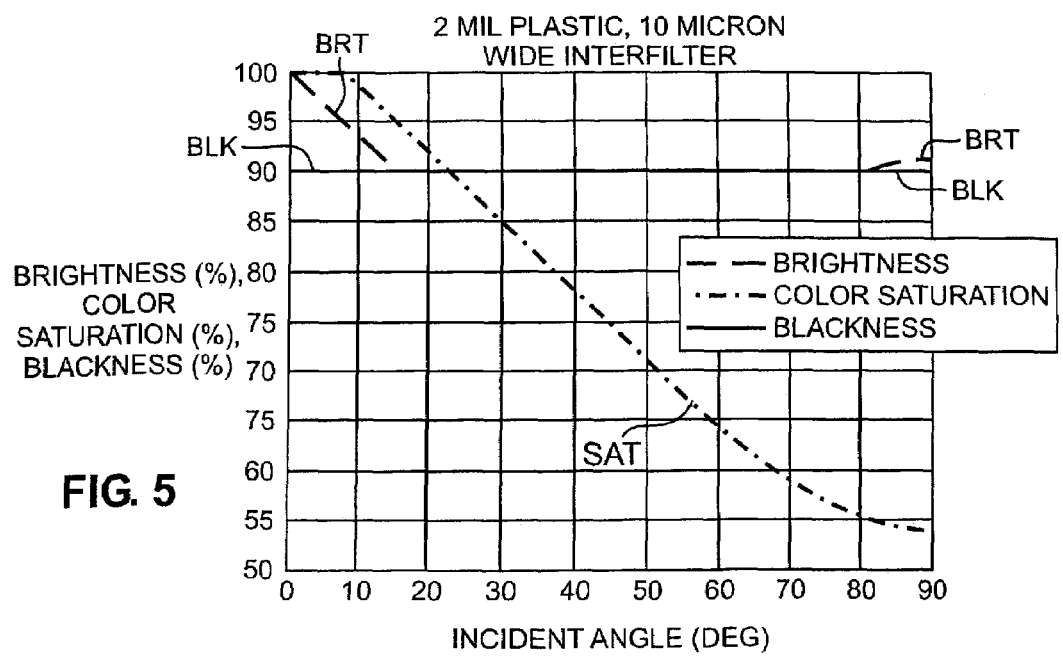
Figure 6:
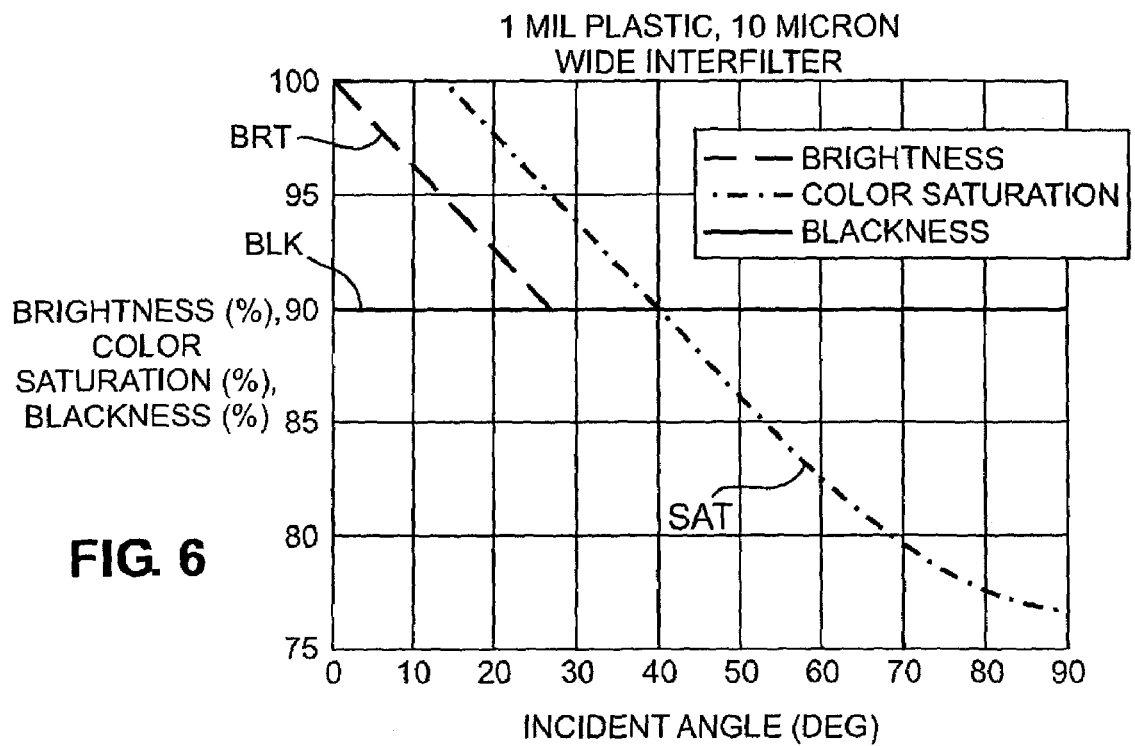
Figure 10:
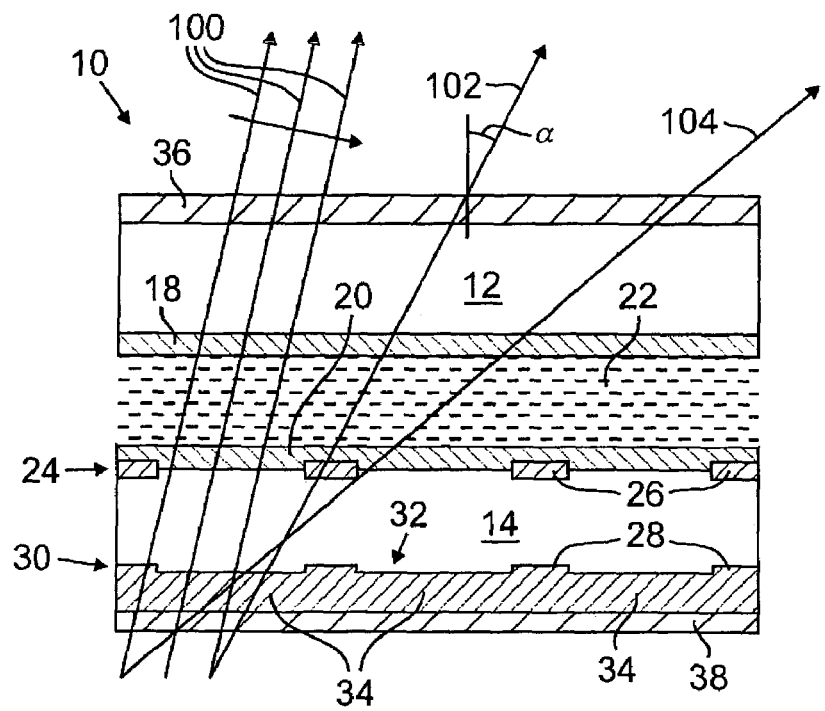
FIG. 10 is the same view as FIG. 7, but with representative light paths added.
Figure 12:
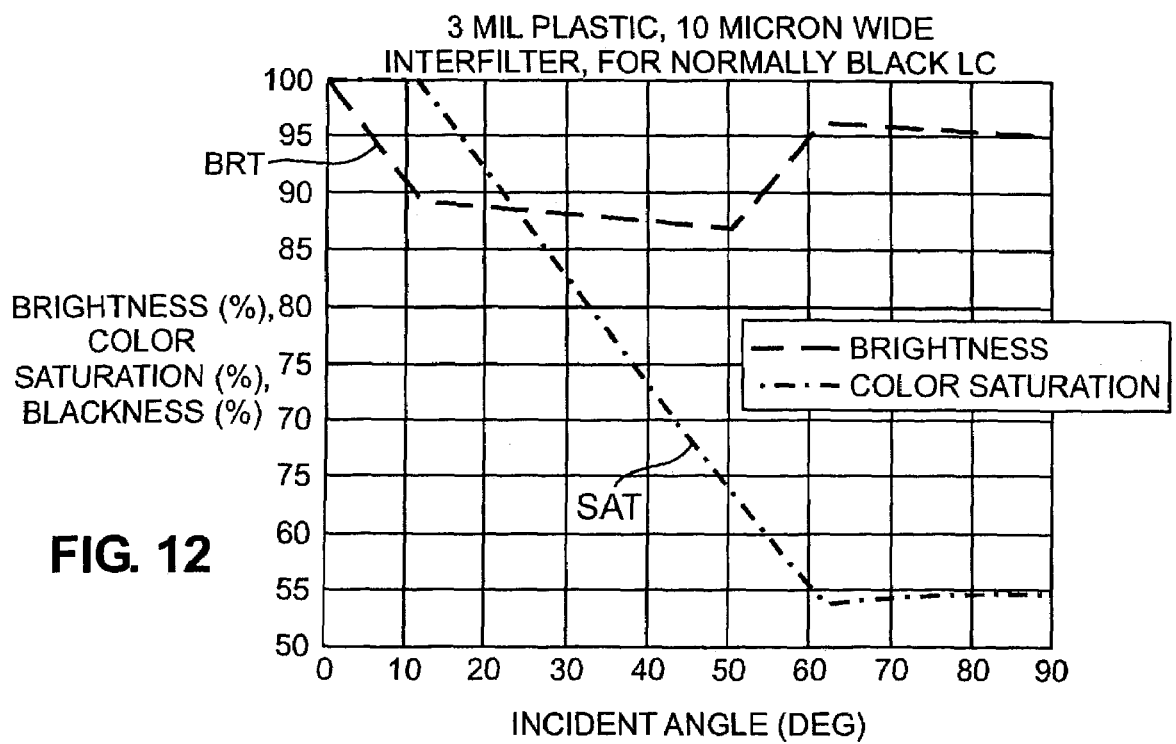
FIGS. 12-14 are graphs of calculated color saturation and brightness for a display of the construction shown in FIGS. 7 and 10 a color filter spacing of 10 µm for a range of light incident angles and substrate thicknesses (FIG. 12, 3 mil.
Figure 13:
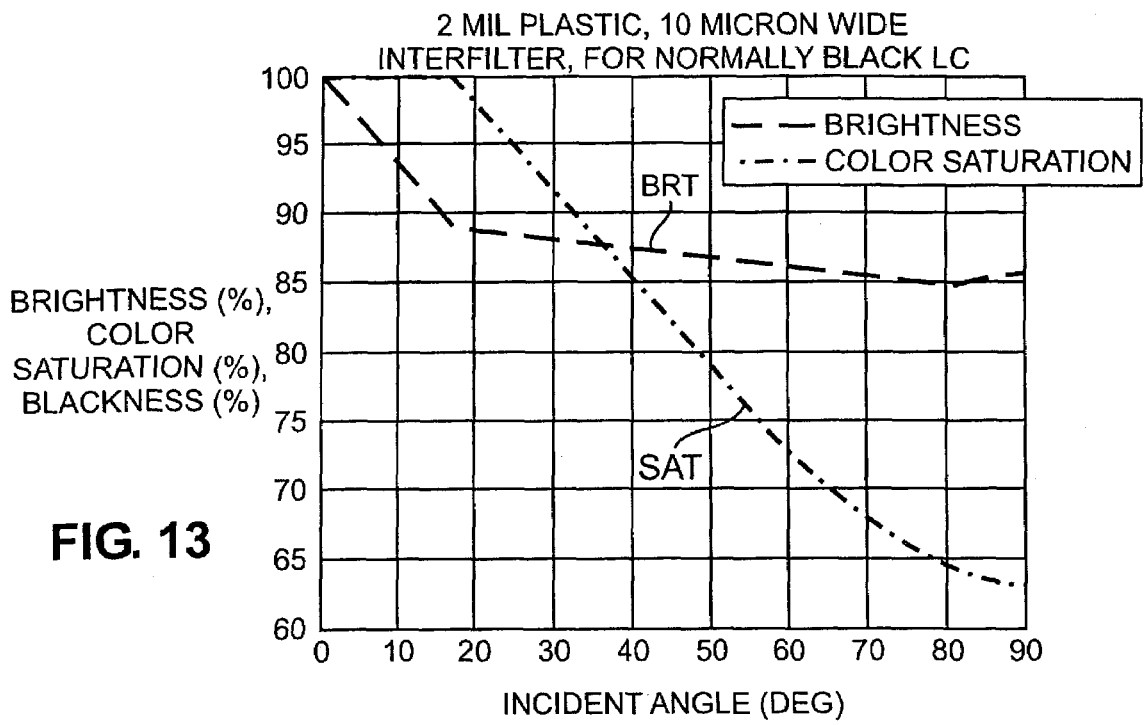
Figure 14:
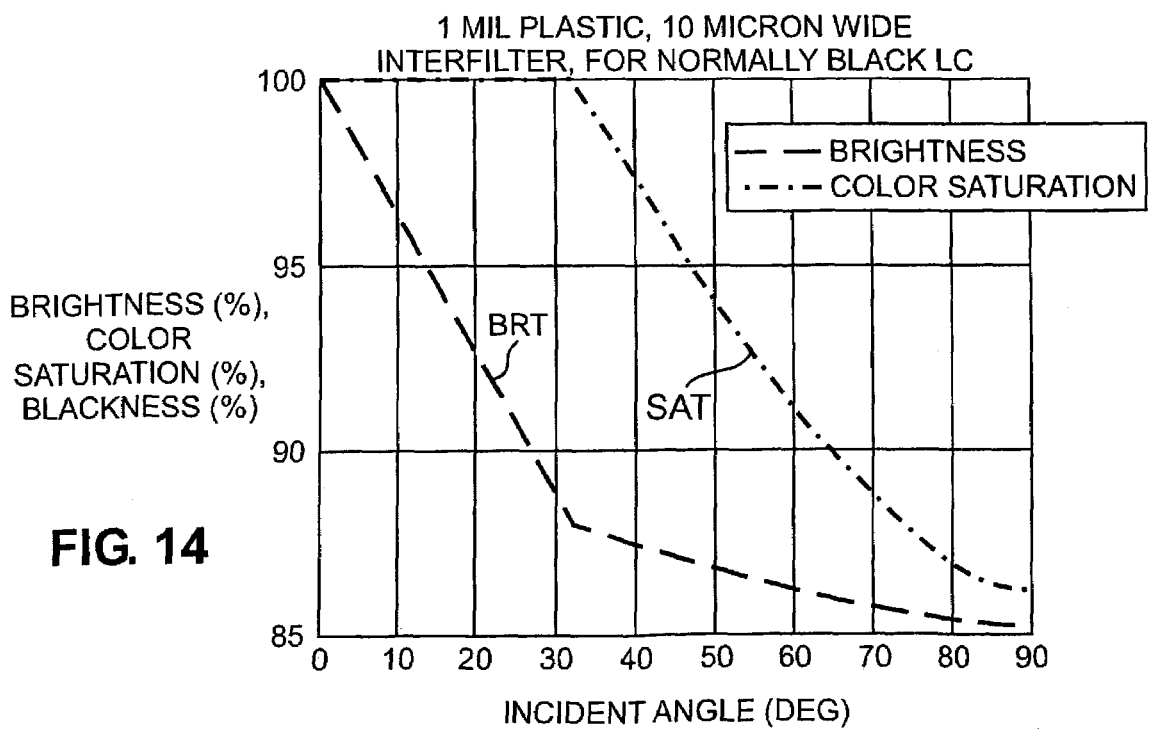

The improved performance of the disclosed implementations of the invention can be understood by comparing FIGS. 2 and 10. In the prior art, when the color filter and black mask layers were positioned outside the display cell, as shown in FIG. 2, light traveling along paths 100 correctly passed through a color filter element and light valve associated with the same sub-pixel. But light traveling along path 102 passed through a color filter element and light valve of adjoining sub-pixels, resulting in degradation of display quality. By contrast, with the implementation of the invention shown in FIG. 10 (same as that shown in FIG. 7), light traveling along path 102 is blocked by black mask elements 26 in black mask layer 24. At higher incident angles α, e.g., light traveling along path 104, there is a loss of color saturation in both the prior art and the FIG. 10 implementation of the invention, as in both cases the light travels through a color filter element of one sub-pixel but a light valve of the adjoining sub-pixel. The implementations of the invention shown in FIGS. 8 and 9 have the potential of reducing this loss of color saturation at high incident angles. Having three black mask layers has the advantage of interrupting the passage of light at high incident angles (but the third layer, as it adds an additional process step and layer of material, may increase manufacturing cost).

A quantitative assessment of the improvement in performance achievable with the FIG. 10 implementation of the invention versus the FIG. 2 prior art can be had by comparing the tables and graphs of color saturation and brightness for the two displays. FIGS. 11-14 show the results for the implementation of FIG. 10, and FIGS. 3-6 show the results for the prior art of FIG. 3. The table and graphs correspond to the same color filter spacing (5, 10, 15, and 20 μm), substrate thicknesses (1, 2, and 3 mil), and incident light angle (0° to 90°). The data in the tables (FIGS. 3 and 11) are for an incident angle of 30°. The data in the graphs (FIGS. 4-6 and 12-14) are for a color filter spacing of 10 μm.

One can see from the tables (FIGS. 3 and 11) that, at an incident angle of 30°, color saturation is improved for all substrate thicknesses and color filter spacings. One can see from the graphs (FIGS. 4-6 and 12-14) that the improvement in color saturation (SAT) is true across all incident angles at a color filter spacing of 10 μm. At higher incident angles, brightness (BRT) is reduced with the implementation of FIG. 10 as compared to the prior art, as the black mask layers of FIG. 10 tend to block light that leaks through the interpixel regions.

Figure 1:
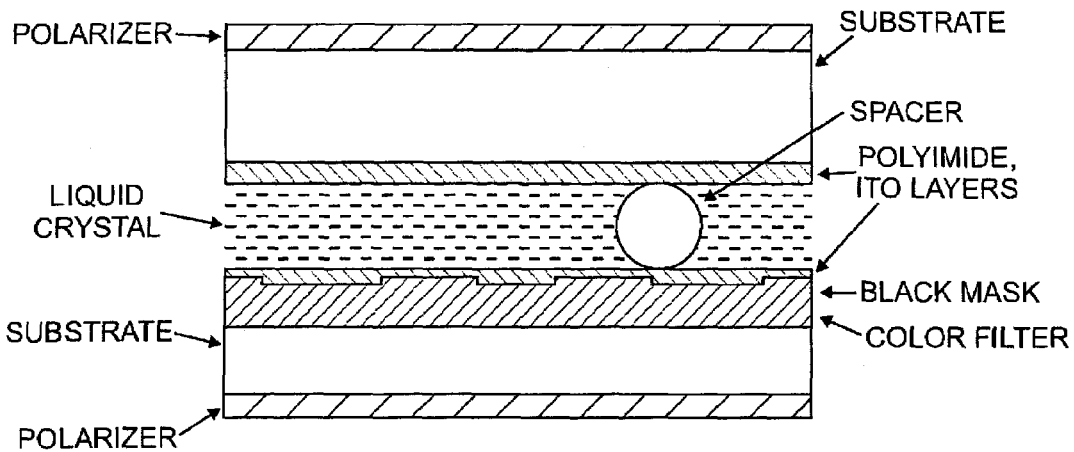
FIG. 1 is a diagrammatic cross-sectional view of a prior art display in which the color filter and black mask layers are located on the inside surface of one of the display substrates.
Figure 18:
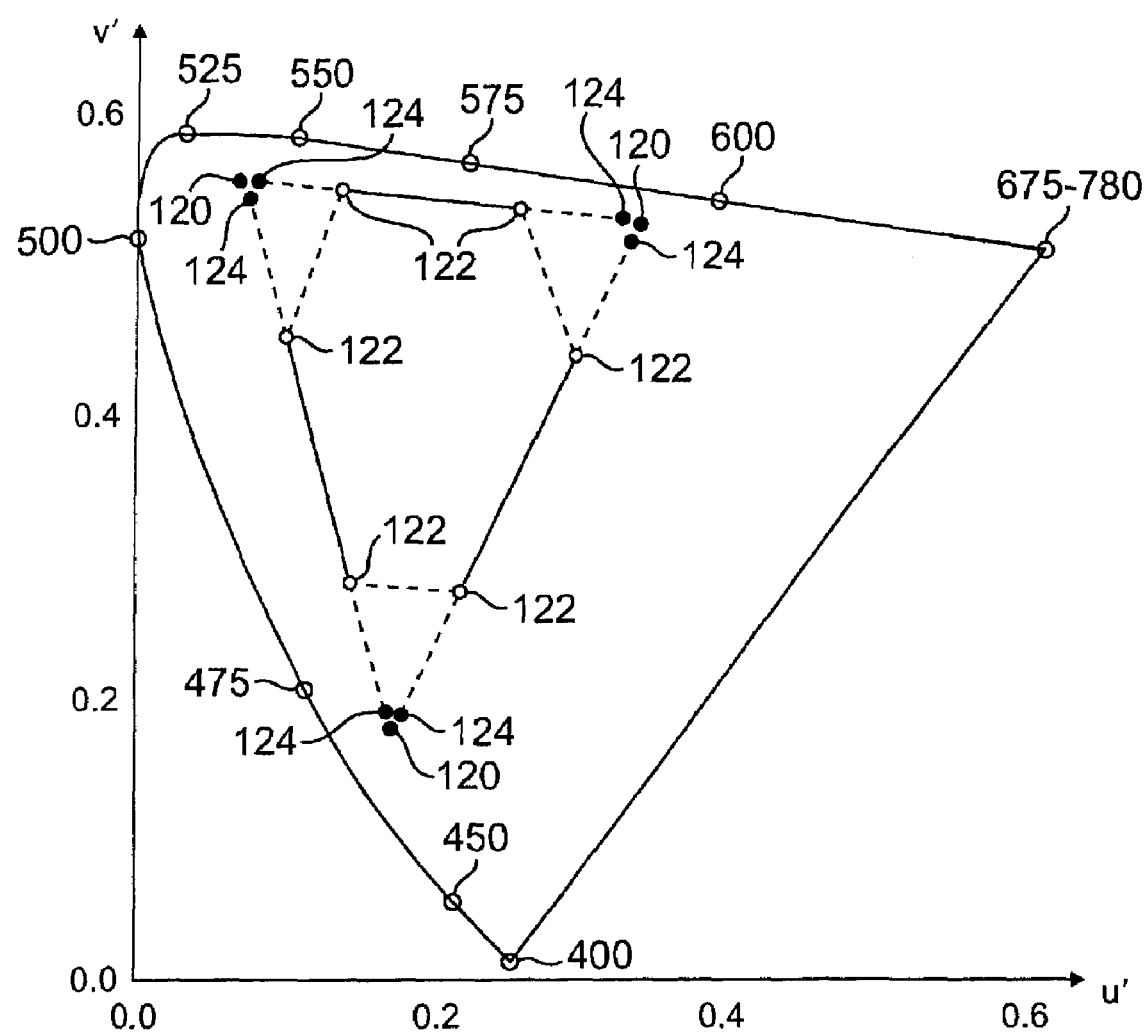
FIG. 18 is a CIE 1976 UCS chromaticity scale diagram comparing the color gamuts of the prior art display of FIG. 2 and the implementation of FIG. 7.

FIG. 18 has the spectral results for the prior art and the implementation of FIG. 7 plotted on the CIE 1976 uniform chromaticity scale (UCS) diagram. The black points 120 illustrate the color performance for current LCD glass color filters as shown in FIG. 1, wherein the color filter is internal to the substrates. The white points 122 show the loss of color saturation for the case of prior art where the color filter is on the outside of the display cell as shown in FIG. 2. In the case of the FIG. 2 prior art, with a 3 mil substrate thickness, a 5 μm black mask width, and a 30° degree viewing angle, the color saturation is decreased by 27%. The gray points 124 show the loss of color saturation for the implementation of FIG. 7 with a black mask height of 1 mil, and a viewing angle of 30°. In that instance, the color saturation is reduced by 2%. With a 3 mil substrate thickness, and a 5 μm black mask width, the color saturation is reduced by 20% (points not shown in the figure).

Many other implementations of the invention other than those described above are within the invention, which is defined by the following claims. For example, all of the black mask layers could be outside of the display cell (e.g., using only the outer two black mask layers of the implementations of FIGS. 8-9). Alternatively, the black mask layers could be entirely within the display cell, e.g., by forming a thick, three-dimensional black mask on the inner surface of one of the display substrates. In the case of a thick, three-dimensional black mask, the aspect ratio would be the ratio of the thickness of the black mask layer to the width of the color sub-pixels. The black mask layers are more tolerant of the harsh processing used in manufacturing the display, and so are more suited to being placed inside the display than is the color filter layer.

The invention claimed is:

1. A color display device including a surface disposed toward a source of light, comprising:
   a first substrate;
   a second substrate facing the first substrate with a gap therebetween;
   an optically active material disposed in the gap between the first substrate and the second substrate;
   a color filter layer formed on the first substrate separated from the optically active material and comprising a plurality of color filters, said color filter layer being located between said surface disposed toward said source of light and said optically active layer;
   a black matrix aligned with boundaries between the color filters and comprising a first black matrix layer formed on the first substrate and a second black matrix layer formed on the first substrate and separated from the first black matrix layer with a gap therebetween.

2. The color display device of claim 1, wherein the first black matrix layer and the second black matrix layer are formed on different surfaces of the first substrate.

3. The color display device of claim 2, wherein the three-dimensional black mask further comprises a third black mask layer.

4. The color display device of claim 2, further comprising a third substrate formed on the color filter layer.

5. The color display device of claim 4, wherein the black mask layers comprise at least one internal layer located between the two substrates and two external layers, each located either on an exterior surface of one of the two substrates or on another substrate external to the two substrates.

6. The color display device of claim 4, wherein the threedimensional black mask has an aspect ratio of at least about 0.2.

7. The color display device of claim 6, wherein the aspect ratio of the black mask is at least about 0.5.

8. The color display device of claim 4, wherein the third substrate is formed between the first substrate and the color filter layer.

9. The color display device of claim 4, wherein the color filter layer is formed between the first substrate and the third substrate.

10. The color display device of claim 4, wherein the optically active material is a liquid crystal.

11. The color display device of claim 2, wherein the three-dimensional black mask has an aspect ratio of at least about 0.2.

12. The color display device of claim 11, wherein the aspect ratio of the black mask is at least about 0.35.

13. The color display device of claim 1, wherein the color filter layer is formed by printing process.

14. The color display device of claim 1, wherein the color filter layer comprises multiple sublayers, at least one for each different color.

15. The color display device of claim 1, wherein the first substrate is formed between the optically active layer and the color filter layer.

16. The color display device of claim 1, further comprising a third substrate formed on the color filter.

17. The color display device of claim 1, wherein a gap between the optically active material and the color filter layer is greater than 1 mil.

18. The color display device of claim 1, wherein each substrate has a thickness in the range of about 20 pm to 500 pm.

19. The color display device of claim 18, wherein each substrate has a thickness in the range of about 30 pm to 250 pm.

20. The color display device of claim 19, wherein each substrate has a thickness in the range of about 50 pm to 150 pm.

21. A display device including a surface disposed toward a source of light, comprising:
   a first panel positioned directly adjacent said light disposed surface and comprising a first substrate and a color filter layer;
   a second panel comprising a second substrate;
   a liquid crystal layer separated from said color filter layer and formed between the first panel and the second panel; and
   a black matrix aligned with boundaries between the color filters and comprising first and second black matrix layers formed at the first panel and separated from each other with a gap there between.

22. The display device of claim 21, wherein the first and second black matrix layers are formed on the first substrate.

23. The display device of claim 22, wherein the first and second black matrix layers are formed on different surfaces of the first substrate.

24. The display device of claim 23, wherein the second black matrix layer is formed between the first substrate and the color filter layer.

25. The display device of claim 22, wherein the first panel further comprises a third substrate.

26. The display device of claim 25, wherein the black matrix further comprises a third black matrix layer formed on the third substrate.

27. The display device of claim 26, wherein the third substrate is formed between the first substrate and the color filter layer.

28. The display device of claim 27, wherein the third black matrix layer is formed between the color filter layer and the third substrate.

29. The display device of claim 26, wherein the color filter is formed between the first substrate and the third substrate.

30. The display device of claim 29, wherein the third black matrix layer is formed between the color filter layer and the third substrate.

31. The display device of claim 21, wherein an aspect ratio of the black matrix is equal to or more than about 0.2.

32. The display device of claim 31, wherein the aspect ratio of the black matrix is equal to or more than 0.35.

33. The display device of claim 32, wherein the aspect ratio of the black matrix is equal to or more than 0.5.

* * * * *